Oct. 8, 1957 R. E. PALMER 2,808,776
MILK CARTON CRUSHER
Filed April 11, 1956 5 Sheets-Sheet 2

INVENTOR.
ROBERT E. PALMER
BY
Sanford Schnurmacher
ATTORNEY

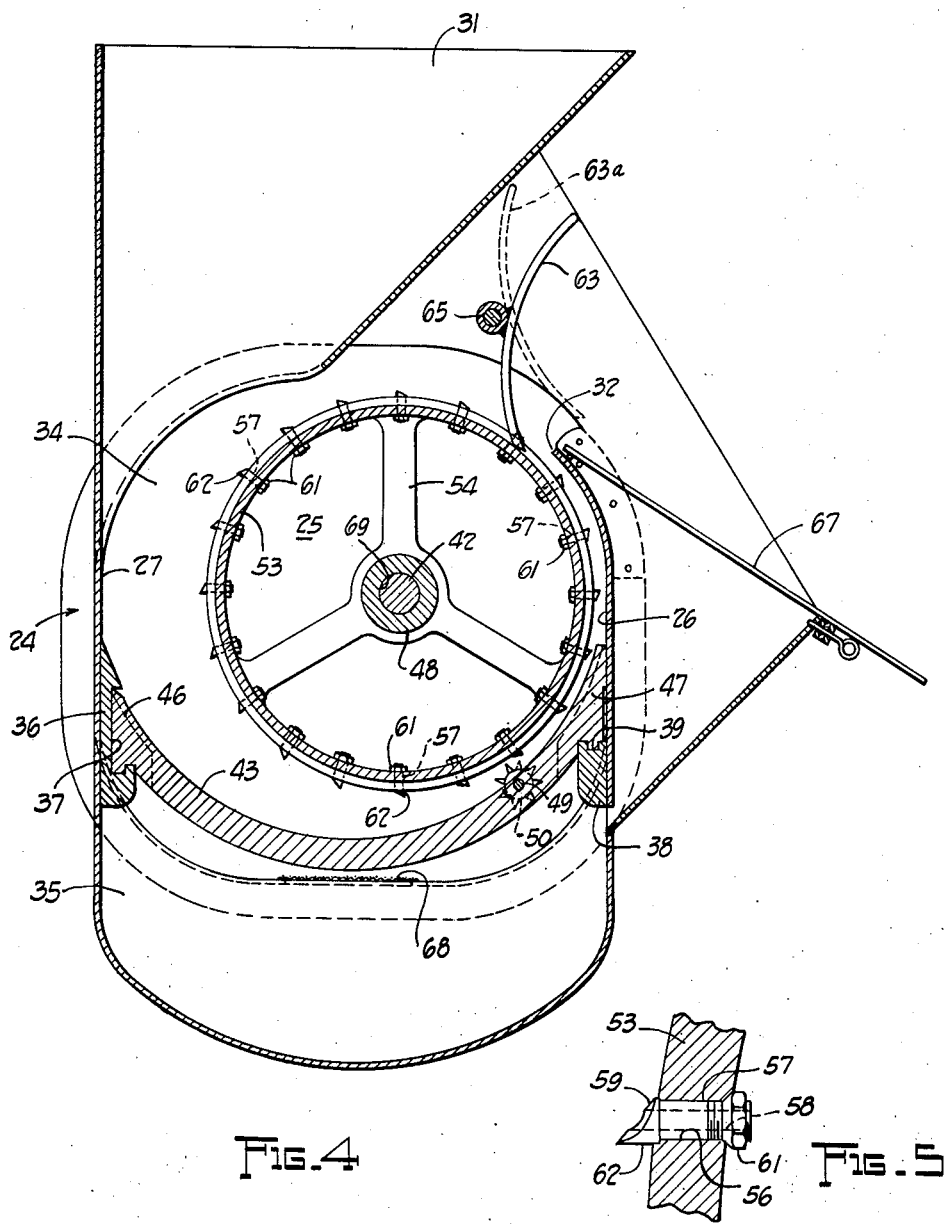

Oct. 8, 1957 R. E. PALMER 2,808,776
MILK CARTON CRUSHER
Filed April 11, 1956 5 Sheets-Sheet 4

INVENTOR.
ROBERT E. PALMER
BY
Sanford Schumacher
ATTORNEY

Oct. 8, 1957  R. E. PALMER  2,808,776
MILK CARTON CRUSHER
Filed April 11, 1956  5 Sheets-Sheet 5

INVENTOR.
ROBERT E. PALMER
BY
Sanford Schnurmacher
ATTORNEY

United States Patent Office 2,808,776
Patented Oct. 8, 1957

2,808,776

MILK CARTON CRUSHER

Robert E. Palmer, Rocky River, Ohio, assignor to Dari-Research Corporation, Cleveland, Ohio Application April 11, 1956, Serial No. 577,563

10 Claims. (Cl. 100—98)

This invention relates to carton crushing machines and particularly to paper milk carton crushers.

Conducive to a better understanding of the invention, it may be well to point out that many liquids are now packaged in paper cartons. This is especially true of dairy products such as whole milk and related milk drinks. Many communities require that the milk carton shall bear a date after which the milk may not be sold. As a result, the unsold milk cartons are returned to the dairy. While considered unsuitable for human consumption, the contained milk has commercial value for the by-products it contains and also as hog feed.

Inasmuch as the method of sealing paper milk cartons renders them non-reusable, nevertheless they must be emptied before being disposed of by burning or the like. Heretofore it has been the practice to empty the filled cartons by slashing them individually with a knife, allowing them to drain, and then disposing of them by baling them or burning them as in the dairy furnaces to reclaim some of their value as heat, the recovered milk being collected in cans and sold to commercial processors. Inasmuch as the average return of past dated cartons normally amounts to 3% of a dairy's volume, in a large dairy the mere disposal of returned cartons can become a major problem.

The primary object of this invention, therefore, is to provide a machine that will automatically and continually drain filled paper milk cartons, crush them, collect the milk in a reservoir and deliver the crushed cartons to a suitable container for further disposition.

Another object is to provide a machine of the type stated having a hopper into which the filled cartons may be thrown without regard as to position or size, between ranges of ½ pint to ½ gallon, or more, depending upon the capacity of the machine.

A further object is to provide a crusher for filled milk cartons that will process 25 gallons of milk carton capacity per minute.

Still another object is to provide such a machine that is rugged in structure, that can be easily dis-assembled for cleaning, and is reliable in operation.

These and other objects of the invention will become apparent from a reading of the following specification and claims, together with the accompanying drawings, wherein:

Figure 4 is a vertical sectional view taken along the line and in the direction of the arrows 4—4 of the Figure 1;

Figure 5 is an enlarged side view of one of the carton draining and piercing pins, showing it mounted on the cylinder member illustrated in section;

Figure 1:
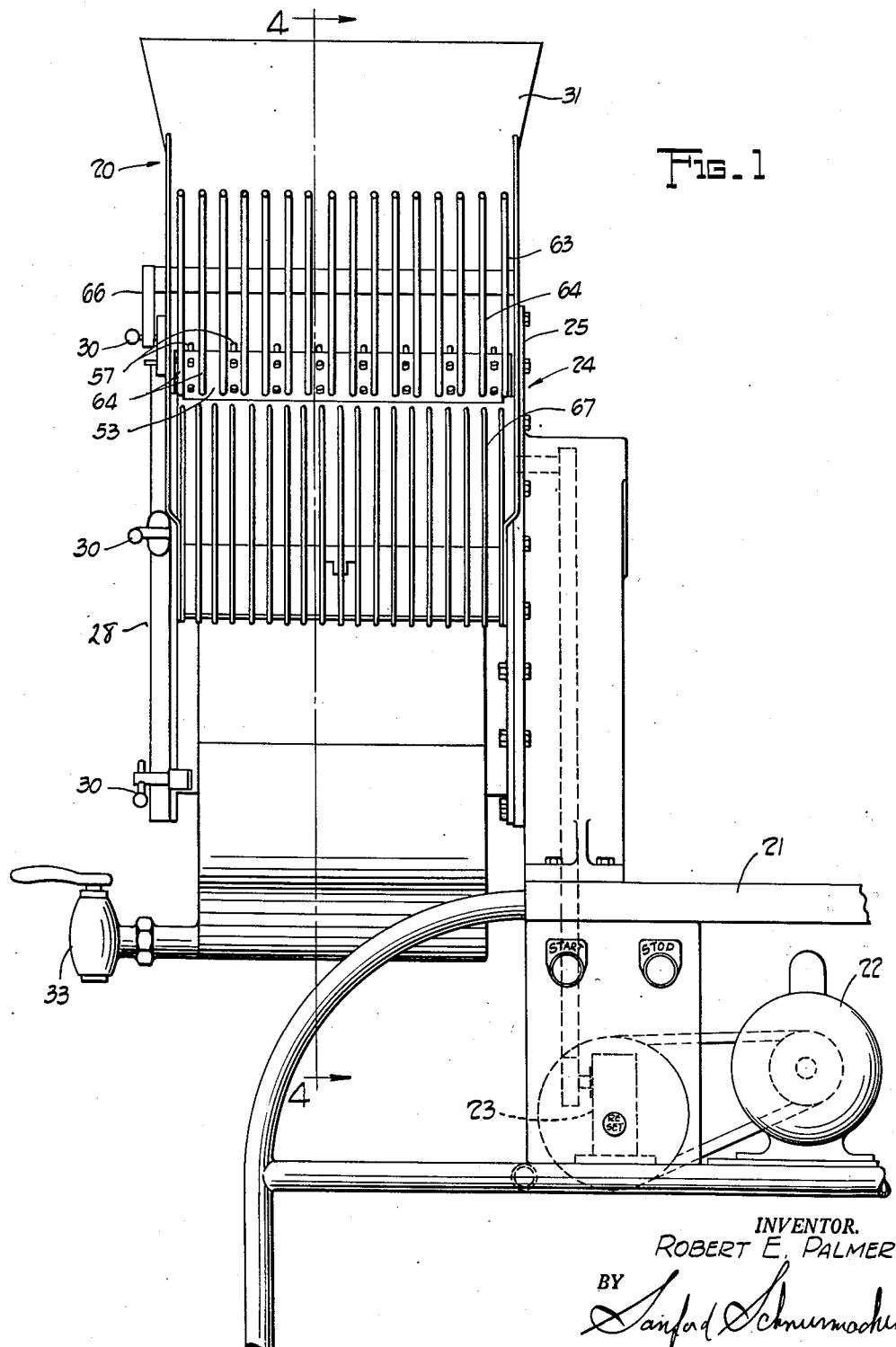
Figure 1 is a side elevation of the milk carton crusher that is the subject of this invention.

Referring more particularly to the drawings, there is seen in the Figure 1 the paper milk carton crusher that is the subject of this invention, broadly indicated by reference numeral 10. Filled milk cartons are deposited in hopper 31 and the emptied and crushed cartons are delivered at the discharge rack 67, the recovered milk being on tap at valve 33.

The entire machine is fabricated from non-corrosive materials, such as stainless steel, in the form hereinafter described.

Figure 2:
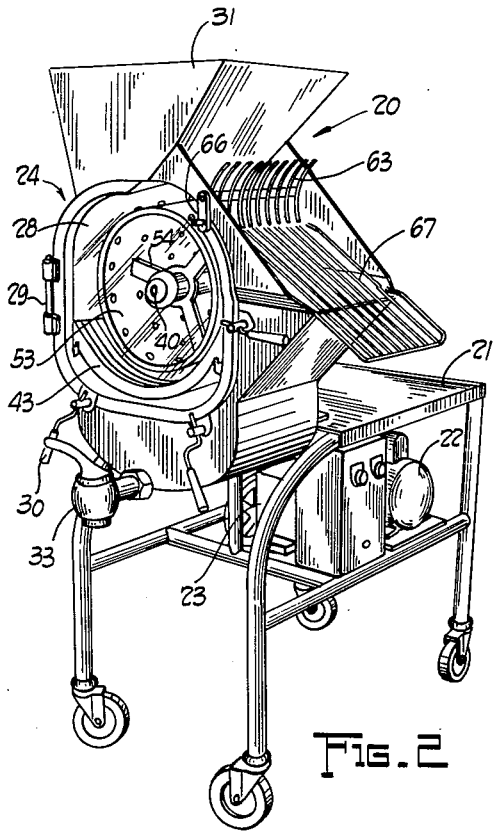
Figure 2 is a front perspective view of the same.

Reference numeral 24 broadly indicates a case member which is mounted on a suitable base 21 that may be either fixed or portable, as illustrated. The case has a rear wall 25, side walls 26 and 27, and a door 28 which forms a front wall when closed, as seen in Figures 1 and 2. A hopper 31 is mounted on the top of the case and a discharge opening 32 is also provided at the top.

A rotating shaft or spindle 42 is journaled at 41 in the rear wall. The spindle 42 is driven through suitable belts and pulleys by motor 22 connected to a speed reduction gear box 23 of the type well known by those skilled in the art.

The door 28 is mounted on a hinge 29, and, as illustrated, is made of a sheet of clear plastic so that the operation of the machine may be clearly visible at all times.

A bearing 40 is positioned in the door 28 and acts as a forward support for the spindle 42 when the door is closed.

Figure 3:
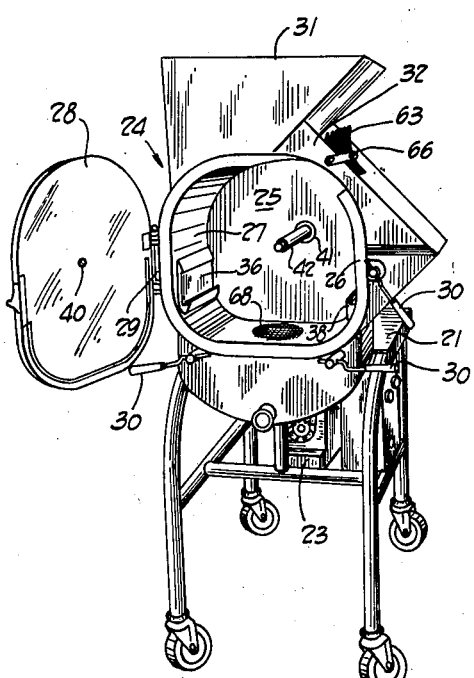
Figure 3 is a front perspective view showing the machine in its dis-assembled condition.

Two parallel and facing brackets 36 and 38 are mounted on the interior side walls 27 and 26, respectively, of the case 24, as is seen most clearly in Figures 3 and 4.

Reference numeral 43 indicates a concave grating which is mounted across the width of the case between the brackets. The rack 43 is provided with keyways 46 and 47 which slidably interfit and mate with matching slots 37 and 39, respectively, formed in the brackets 36 and 38.

The grating 43 is concave in shape and, in the form illustrated, its radius of curvature is eight inches, although it is to be understood that other radii may be used depending upon the size of the machine. A plurality of parallel and spaced slots 45 are cut through the grating and form a plurality of parallel and spaced ribs 44 which form the working surface of the grating. The so-positioned grating divides the case horizontally into upper and lower chambers 34 and 35 respectively.

A hollow cylinder, or drum, 53 is mounted in the upper chamber 34 on the spindle 42. The cylinder 53 is of smaller radius than the radius of curvature of the grating 43. In the instant example, the cylinder has a radius of six inches and is mounted excentric of the center of curvature of the grating.

As illustrated in Figure 4, the peripheral surface of the cylinder is spaced approximately 3¾ inches from the grating at its key point 46. The distance between the cylinder surface and the grating then becomes progressively less until at the key point 47 the distance between them is only ⅜ inch.

Figure 6:
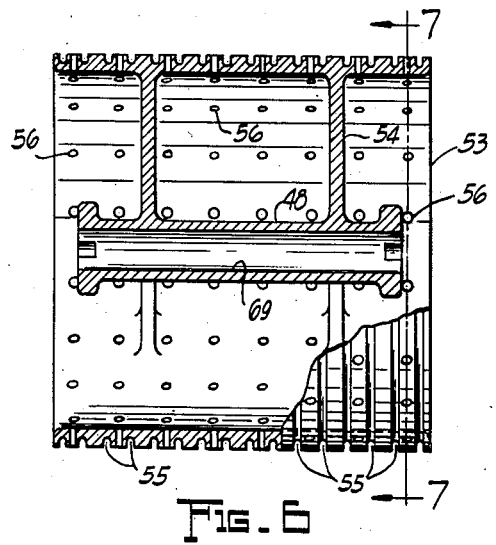
Figure 6 is a front elevation of the cylinder member partly broken away and in section.
Figure 7:
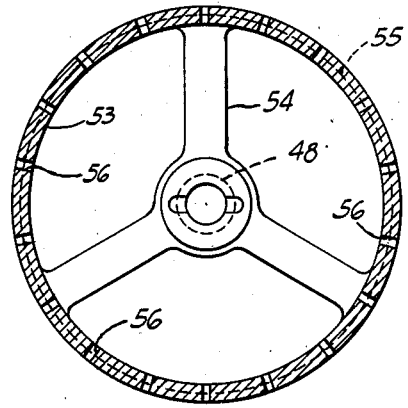
Figure 7 is a vertical sectional view of the same taken along the line and in the direction of the arrows 7—7 of the Figure 6.
Figure 8:
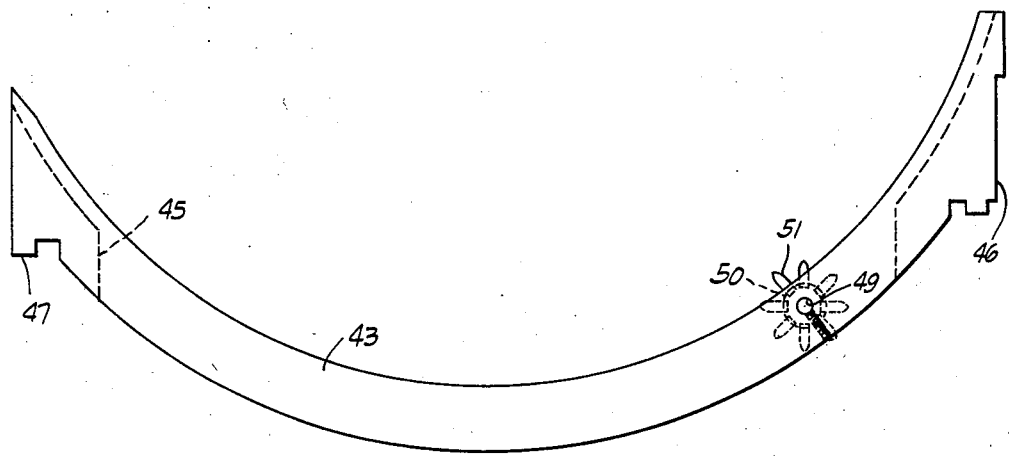
Figure 8 is a front view of the grating member.
Figure 10:
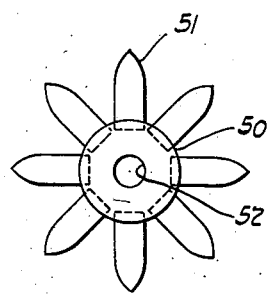
Figure 10 is a front view of one of the grating piercing dogs.
Figure 11:
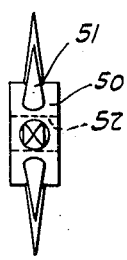
Figure 11 is a right end view of the same.
Figure 9:
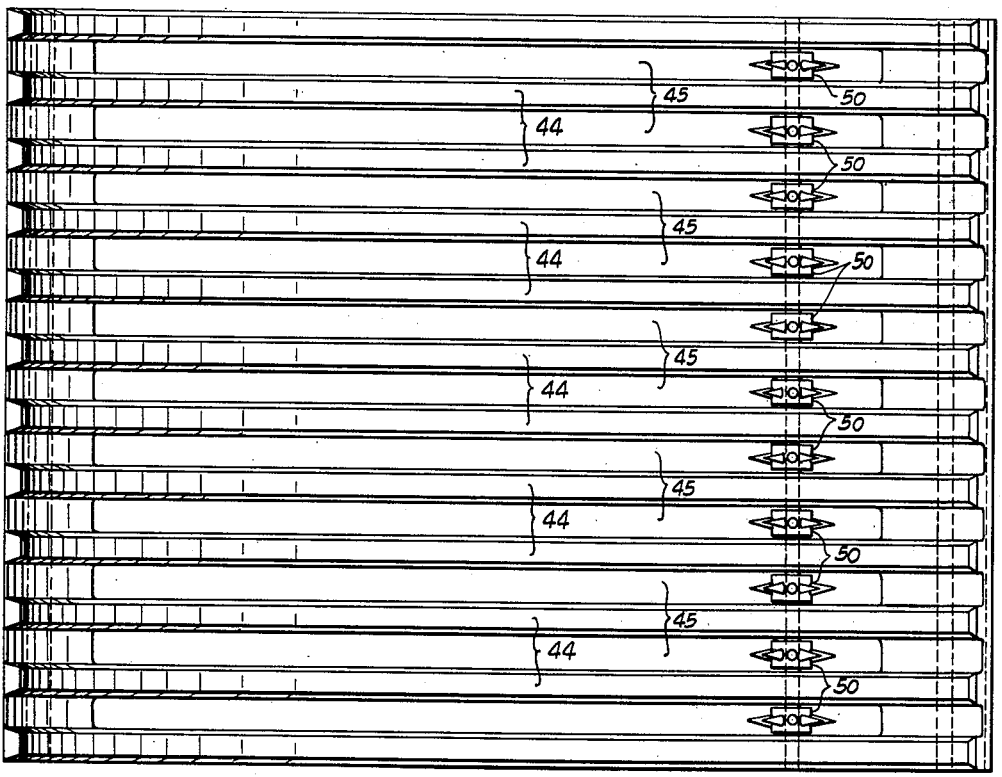
Figure 9 is a top plan view of the same.
Figure 16:
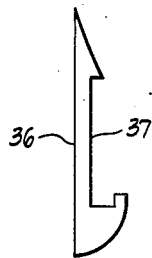
Figure 16 is a left end view of the same.
Figure 15:
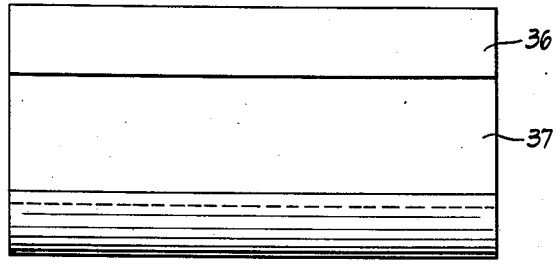
Figure 15 is a front view of the first of the grating support brackets.
Figure 17:
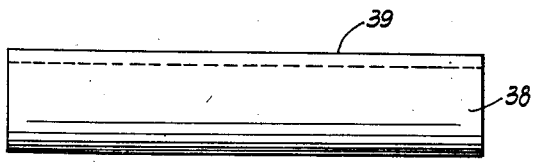
Figure 17 is a front elevation of the second of the grating support brackets.
Figure 18:
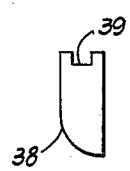
Figure 18 is a right end view of the same.

As is seen most clearly in Figures 6 and 7, the cylinder 53 is supported on a central hub 48 by means of spiders 54. The cylinder 53 is mounted on the spindle 42 through bore 69 in its hub 48, and is locked against rotation relative to spindle 42 by suitable keying means.

Reference numeral 56 indicates a plurality of spaced holes arranged in parallel rows around the periphery of the cylinder 53. Reference numeral 55 indicates a plurality of circumferential parallel grooves positioned between the rows of holes 56.

Figure 14:
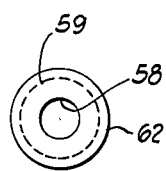
Figure 14 is a left end view of the same.
Figure 12:
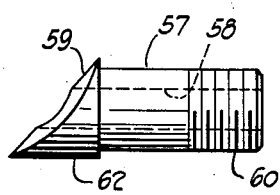
Figure 12 is an enlarged side view of one of the cylinder piercing pins in its unmounted condition.
Figure 13:
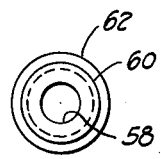
Figure 13 is a right end view of the same.

A carton piercing pin 57 is mounted in each of the holes 56. Each pin 57 comprising a tubular body having a bore 58 therethrough and has a shouldered head end 62 and a threaded end 60, as seen in Figures 12, 13 and 14. The head end is cut at an angle of 50 degrees to the center bore to provide a pointed piercing surface 59. In addition, the face 59 is laterally ground to a convex radius of 7/32 inch. Each pin 57 is held in place in the cylinder holes 56 by means of nuts 61 which engage the threaded end 60, as seen in Figure 5.

Reference numeral 63 indicates a rake which is pivotally mounted on a shaft 65 at the carton discharge opening 32. The rake comprising a plurality of concave shaped teeth 64 which are so spaced that their lower ends will ride in the cylinder grooves 55 when in their operating position, as seen in Figures 1, 2 and 4. The rake 63 may be tilted, to an alternate position 63a, by means of handle 66, in which position the teeth 64 are raised clear of the cylinder grooves 55 when it is desired to remove the cylinder from the machine for cleaning.

Reference numeral 50 indicates a plurality of freely rotatable piercing dogs which are mounted in the grating slots 45 on a stationary shaft 49. The dogs 50 comprise a hub having a central bore 52. A plurality of piercing pins 51 are spaced around the hub. The dogs are positioned proximate the discharge end of the grating and protrude above the grating and just clear (1/16") the peripheral face of the cylinder 53. The dogs are positioned between the rows of piercing pins 57 of the cylinder 53.

A filter screen 68 is positioned in the lower chamber 35 below the grating 43, and acts to hold any scraps of paper or metal that may be torn from the cartons as they are being crushed. The recovered milk is held in the lower chamber 35 and may be removed when necessary through the spigot 33.

In operation, the full cartons of milk are deposited in the hopper 31, and fall between the grating 43 and the moving cylinder 53. The curvature of the grating 43 acts to permit small cartons, such as the ½ pint size, to fall further toward the center until they contact the moving cylinder. The weight of the filled cartons normally acts to move them to a point where the distance between the cylinder and grating is less than the thickness of the carton. At this point, the piercing pins 57 of the cylinder begin to penetrate the carton wall and drag the carton along. Further movement of the carton between the cylinder and grate forces the piercing pins 57 through the carton wall. The contained milk, now under pressure, due to the squeeze being applied to the carton, is free to escape through the bores 56 of the piercing pins 57. As the crushing pressure increases, the milk is quickly forced out of the carton.

Inasmuch as there is clearance between the case 24 and the ends of the cylinder 53, the milk is free to drain down through the grating slots 45 into the lower chamber 35, first being strained through the filter 68.

As described, the cartons are now empaled on the piercing pins 57. As they approach the part of greatest compression the underside of the cartons are slashed by the cutting points of the grating dogs 50 and any fluid remaining in the carton is released through these additional slots. The so impaled and crushed cartons are carried along by the cylinder and are removed from the piercing pins 57 by the rake 63 whose teeth 64 ride in the cylinder grooves 55. The crushed cartons are peeled off the cylinder 53 by the rake 63 and fall upon the discharge rack 67 from which they drop into a suitable container positioned below the rack 67.

To dismantle the machine for cleaning, the rake is tilted to position 63a, clear of the cylinder grooves 55, as shown in Figure 3. The door 38 is opened by releasing the three clamps 30. The cylinder 53 can then be pulled off the spindle 42 after releasing its locking means. The grating is then pulled off of its supporting brackets 36 and 38. By referring to Figure 3, it will be seen that the entire interior of the case 24 is now free of all obstructions and may be easily cleaned. The arrangement of the keyed elements of the cylinder and grating makes it impossible to reassemble the parts in other than the correct manner.

While the device has been described in connection with the crushing of milk cartons and the recovery of the contained milk, it should be understood that any type of liquid packaged in paper cartons may be processed by this machine.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A device for crushing liquid filled paper cartons, comprising in combination, a case member having a hoppered inlet and a crushed carton discharge opening at the top thereof and a liquid drain at the bottom thereof, a concave grating mounted in the case and dividing the same into upper and lower chambers, a hollow cylinder of smaller radius than that of the grating, rotatably mounted in the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, and means for removing the impaled crushed carton from the piercing pins at the discharge opening of the case, the drained liquid being collected in the lower chamber.

2. A device for crushing liquid filled paper cartons, comprising in combination, a case member having a hoppered inlet and a crushed carton discharge opening at the top thereof and a liquid drain at the bottom thereof, a concave grating mounted in the case and dividing the same into upper and lower chambers, a hollow cylinder of smaller radius than that of the grating, rotatably mounted in the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, and a rake mounted above the cylinder having teeth positioned between the piercing pins and adapted to lift off the impaled crushed cartons at the discharge opening of the case, the drained liquid being collected in the lower chamber.

3. A device for crushing liquid filled paper cartons, comprising in combination, a case member having a hoppered inlet and a crushed carton discharge opening at the top thereof and a liquid drain at the bottom thereof, a concave grating mounted in the case and dividing the same into upper and lower chambers, a hollow cylinder of smaller radius than that of the grating, rotatably mounted in the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, the said pins being arranged in spaced parallel rows having circumferential grooves therebetween, and a concave rake mounted above the cylinder, having teeth positioned in the grooves and adapted to lift the impaled crushed cartons off the piercing pins at the discharge opening of the case, the drained liquid being collected in the lower chamber.

4. A device for crushing liquid filled paper cartons, comprising in combination, a case member having a hoppered inlet and a crushed carton discharge opening at the top thereof and a liquid drain at the bottom thereof, a concave grating mounted in the case and dividing the same into upper and lower chambers, the grating comprising a plurality of spaced parallel ribs, a hollow cylinder of smaller radius than that of the grating, rotatably mounted in the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, and means for removing the impaled crushed carton from the piercing pins at the discharge opening of the case, the drained liquid being collected in the lower chamber.

5. A device for crushing liquid filled paper cartons, comprising in combination, a case member having a hoppered inlet and a crushed carton discharge opening at the top thereof and a liquid drain at the bottom thereof, a concave grating mounted in the case and dividing the same into upper and lower chambers, the grating comprising a plurality of spaced parallel ribs, a hollow cylinder of smaller radius than that of the grating rotatably mounted in the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, a freely rotatable piercing dog journaled between each pair of grating ribs and adapted to pierce the grating engaging face of the moving carton, and the drained liquid being collected in the lower chamber.

6. A device for crushing liquid filled paper cartons, comprising in combination, a case member having a hoppered inlet and a crushed carton discharge opening at the top thereof and a liquid drain at the bottom thereof, a concave grating mounted in the case and dividing the same into upper and lower chambers, the grating comprising a plurality of spaced parallel ribs, a hollow cylinder of smaller radius than that of the grating, rotatably mounted in the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, the said pins being arranged in spaced parallel rows having circumferential grooves therebetween, a freely rotatable piercing dog journaled between each pair of grating ribs and adapted to pierce the grating engaging face of the moving carton, and a concave rake mounted above the cylinder, having teeth positioned in the grooves and adapted to lift the impaled crushed cartons off the piercing pins at the discharge opening of the case, the drained liquid being collected in the lower chamber.

7. A device for crushing liquid filled paper cartons, comprising in combination, a case member having a hoppered inlet and a crushed carton discharge opening at the top thereof, a liquid drain at the bottom thereof, rear and side walls, and a hinged door forming the front wall thereof, the side walls having parallel and slotted brackets mounted thereon, a concave grating removably mounted on the brackets, across the case and dividing the same into upper and lower chambers, a hollow cylinder of smaller radius than that of the grating, journaled in the door and rear wall of the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, and means for removing the impaled crushed carton from the piercing pins at the discharge opening of the case, the drained liquid being collected in the lower chamber.

8. A device for crushing liquid filled paper cartons, comprising in combination, a case member having a hoppered inlet and a crushed carton discharge opening at the top thereof, a liquid drain at the bottom thereof, rear and side walls, and a hinged door forming the front wall thereof, the side walls having parallel and slotted brackets mounted thereon, a concave grating removably mounted on the brackets, across the case and dividing the same into upper and lower chambers, a hollow cylinder of smaller radius than that of the grating, journaled in the door and rear wall of the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, and a rake mounted above the cylinder having teeth positioned between the piercing pins and adapted to lift off the impaled crushed cartons at the discharge opening of the case, the drained liquid being collected in the lower chamber.

9. A device for crushing liquid filled paper cartons, comprising in combination, a case member having a hoppered inlet and a crushed carton discharge opening at the top thereof, a liquid drain at the bottom thereof, rear and side walls, and a hinged door forming the front wall thereof, the side walls having parallel and slotted brackets mounted thereon, a concave grating removably mounted on the brackets, across the case and dividing the same into upper and lower chambers, a hollow cylinder of smaller radius than that of the grating, journaled in the door and rear wall of the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, the said pins being arranged in spaced parallel rows having circumferential grooves therebetween, and a concave rake mounted above the cylinder, having teeth positioned in the grooves and adapted to lift the impaled crushed cartons off the piercing pins at the discharge opening of the case, the drained liquid being collected in the lower chamber.

10. A device for crushing liquid filled paper cartons, comprising in combination, a case member having a hoppered inlet and a crushed carton discharge opening at the top thereof, a liquid drain at the bottom thereof, rear and side walls, and a hinged door forming the front wall thereof, the side walls having parallel and slotted brackets mounted thereon, a concave grating removably mounted on the brackets, across the case and dividing the same into upper and lower chambers, the said grating having a plurality of parallel slots therethrough extending the width thereof, a hollow cylinder of smaller radius than that of the grating, journaled in the door and rear wall of the upper chamber, excentric thereof, with the peripheral face thereof proximate the grating, means for rotating the cylinder, the cylinder having a plurality of hollow carton-piercing pins mounted through the periphery thereof which pierce and drain the liquid filled carton as it is crushed between the rotating cylinder and the grating, the said pins being arranged in spaced parallel rows having circumferential grooves therebetween, a freely rotatable piercing dog journaled in each grating slot and adapted to pierce the grating engaging face of the moving carton, and a concave rake mounted above the cylinder, having teeth positioned in the grooves and adapted to lift the impaled crushed cartons off the piercing pins at the discharge opening of the case, the drained liquid being collected in the lower chamber.

References Cited in the file of this patent
UNITED STATES PATENTS

| | | |
|---|---|---|
| 740,168 | Neuert | Sept. 29, 1903 |
| 2,350,603 | Fry | June 6, 1944 |

FOREIGN PATENTS

| | | |
|---|---|---|
| 171,206 | Great Britain | 1921 |
| 59,803 | France | Aug. 23, 1954 |

(Addition to No. 991,201)